(12) United States Patent
Long

(10) Patent No.: US 6,902,053 B1
(45) Date of Patent: Jun. 7, 2005

(54) CONVEYOR BELT ALIGNMENT SYSTEM

(76) Inventor: Rodney Long, 4695 County Rd. 29, Pick City, ND (US) 58545

( * ) Notice: Subject to any disclaimer, the term of this patent is extended or adjusted under 35 U.S.C. 154(b) by 0 days.

(21) Appl. No.: 10/930,448

(22) Filed: Aug. 30, 2004

Related U.S. Application Data

(63) Continuation of application No. 10/686,838, filed on Oct. 14, 2003, now abandoned.

(51) Int. Cl.[7] .............................................. B65G 15/60
(52) U.S. Cl. ........................ 198/840; 198/842; 198/837
(58) Field of Search ................................. 198/840, 842, 198/837, 836.1, 806, 809, 831

(56) References Cited

U.S. PATENT DOCUMENTS

| | | | | |
|---|---|---|---|---|
| 1,821,664 | A | * 9/1931 | Peiler | 198/840 |
| 2,725,757 | A | * 12/1955 | Murphy | 198/842 |
| 3,066,547 | A | * 12/1962 | Evans | 198/840 |
| 3,198,115 | A | * 8/1965 | Harvey | 198/840 |
| 3,203,537 | A | * 8/1965 | Holladay | 198/840 |
| 3,368,665 | A | * 2/1968 | Jinkins | 198/840 |
| 3,550,535 | A | * 12/1970 | Rooklyn | 198/840 |
| 3,710,927 | A | 1/1973 | Alsted | 198/202 |
| 3,913,729 | A | 10/1975 | Andrews | 198/202 |
| 3,927,814 | A | * 12/1975 | Holm | 198/837 |
| 4,367,031 | A | 1/1983 | Hamaker | 355/3 |
| 4,557,372 | A | 12/1985 | Rajagopal | 198/807 |
| 4,650,065 | A | 3/1987 | Savinykh et al. | 198/828 |
| 4,790,428 | A | 12/1988 | Ramsey | 198/840 |
| 5,117,969 | A | 6/1992 | Roth | 198/807 |
| 5,161,666 | A | 11/1992 | Pope | 198/498 |
| 5,205,399 | A | 4/1993 | Millhollin | 198/840 |
| 5,219,063 | A | 6/1993 | Wyatt | 198/840 |
| 5,299,674 | A | 4/1994 | Cusitar | 198/303 |
| 5,884,754 | A | 3/1999 | Fromm | 198/807 |
| 5,897,214 | A | 4/1999 | Nisley | 384/537 |
| 6,053,307 | A | * 4/2000 | Honda | 198/839 |
| 6,095,320 | A | 8/2000 | DeMong et al. | 198/812 |
| 6,237,753 | B1 | 5/2001 | Walter et al. | 198/824 |
| 2001/0023815 | A1 | 9/2001 | Mott | 198/617 |

FOREIGN PATENT DOCUMENTS

| | | | |
|---|---|---|---|
| EP | 0522262 | 1/1993 | |
| GB | 1332235 | * 10/1973 | 198/840 |
| JP | 0043115 | * 2/1990 | 198/840 |
| JP | 4-159911 | 6/1992 | |

* cited by examiner

*Primary Examiner*—James R. Bidwell

(57) ABSTRACT

A conveyor belt alignment system for maintaining a maintaining a conveyor belt's alignment under various operating conditions. The conveyor belt alignment system includes a mounting plate for attaching to a structure, a first plate attached to a second plate, wherein the second plate is adjustably attached to the mounting plate, a support frame adjustably positioned upon the first plate, a plurality of first idlers extending from the support frame, and a plurality of second idlers extending from the support frame. The first idlers are positioned on opposite surfaces of the conveyor belt for vertical alignment. The second idlers are positioned on a same side as the conveyor belt for horizontal alignment of the conveyor belt. The second idlers have an upper guide member and a lower guide member, wherein the conveyor belt is positioned between the upper and lower guide members.

20 Claims, 14 Drawing Sheets

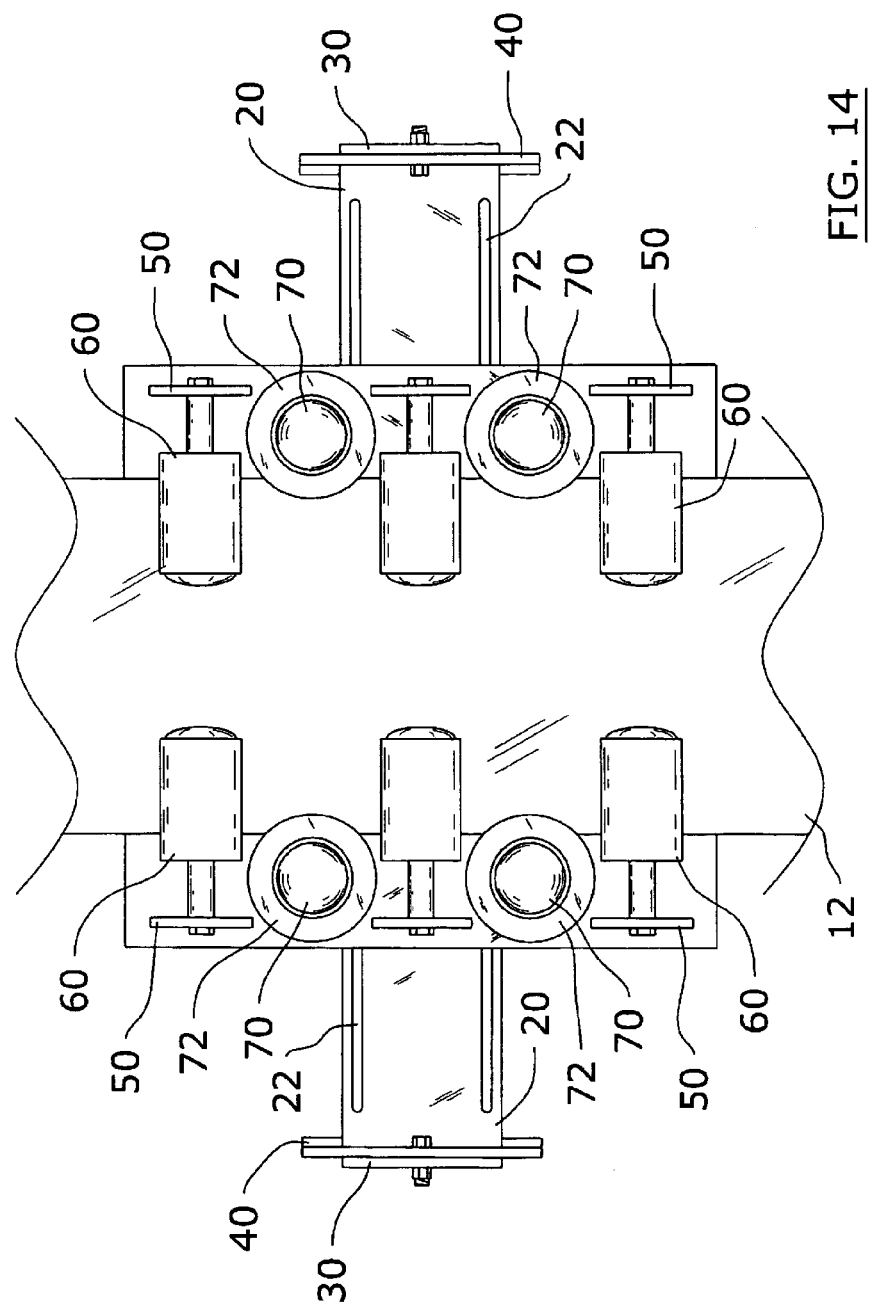

CONVEYOR BELT ALIGNMENT SYSTEM

CROSS REFERENCE TO RELATED APPLICATIONS

I hereby claim benefit under Title 35, United States Code, Section 120 U.S. patent application Ser. No. 10/686,838 filed Oct. 14, 2003. This application is a continuation of the Ser. No. 10/686,838 application now ABN. The Ser. No. 10/686,838 application is incorporated by reference into this patent application.

STATEMENT REGARDING FEDERALLY SPONSORED RESEARCH OR DEVELOPMENT

Not applicable to this application.

BACKGROUND OF THE INVENTION

1. Field of the Invention

The present invention relates generally to conveyor belt support devices and more specifically it relates to a conveyor belt alignment system for maintaining a maintaining a conveyor belt's alignment under various operating conditions.

2. Description of the Related Art

Conveyors are utilized in various types of equipment and industries to transfer particulate material. Conveyor belts on conveyors need to be aligned along a longitudinal axis to avoid unnecessary wear and tear. Conventional conveyors have rollers supporting the lower side of the conveyor belt, but little support is provided to the side-to-side movement of the conveyor. One attempted solution is "training idlers" but they do not provide the desired control of a conveyor belt.

While these devices may be suitable for the particular purpose to which they address, they are not as suitable for maintaining a maintaining a conveyor belt's alignment under various operating conditions. Conventional conveyors do not provide adequate belt alignment functionality.

In these respects, the conveyor belt alignment system according to the present invention substantially departs from the conventional concepts and designs of the prior art, and in so doing provides an apparatus primarily developed for the purpose of maintaining a maintaining a conveyor belt's alignment under various operating conditions.

BRIEF SUMMARY OF THE INVENTION

In view of the foregoing disadvantages inherent in the known types of conveyors now present in the prior art, the present invention provides a new conveyor belt alignment system construction wherein the same can be utilized for maintaining a maintaining a conveyor belt's alignment under various operating conditions.

The general purpose of the present invention, which will be described subsequently in greater detail, is to provide a new conveyor belt alignment system that has many of the advantages of the conveyors mentioned heretofore and many novel features that result in a new conveyor belt alignment system which is not anticipated, rendered obvious, suggested, or even implied by any of the prior art conveyors, either alone or in any combination thereof.

To attain this, the present invention generally comprises a mounting plate for attaching to a structure, a first plate attached to a second plate, wherein the second plate is adjustably attached to the mounting plate, a support frame adjustably positioned upon the first plate, a plurality of first idlers extending from the support frame, and a plurality of second idlers extending from the support frame. The first idlers are positioned on opposite surfaces of the conveyor belt for vertical alignment. The second idlers are positioned on the same surface as the conveyor belt for horizontal alignment of the conveyor belt. The second idlers have an upper guide member and a lower guide member, wherein the conveyor belt is positioned between the upper and lower guide members.

There has thus been outlined, rather broadly, the more important features of the invention in order that the detailed description thereof may be better understood, and in order that the present contribution to the art may be better appreciated. There are additional features of the invention that will be described hereinafter and that will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of the description and should not be regarded as limiting.

A primary object of the present invention is to provide a conveyor belt alignment system that will overcome the shortcomings of the prior art devices.

A second object is to provide a conveyor belt alignment system for maintaining a maintaining a conveyor belt's alignment under various operating conditions.

Another object is to provide a conveyor belt alignment system that may be utilized upon various types of conveyors and conveyor belts.

An additional object is to provide a conveyor belt alignment system that is adjustable.

A further object is to provide a conveyor belt alignment system that assists in extending the useful life of a conveyor belt.

Another object is to provide a conveyor belt alignment system that reduces the side-to-side movement of a conveyor belt.

Other objects and advantages of the present invention will become obvious to the reader and it is intended that these objects and advantages are within the scope of the present invention.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWINGS

Various other objects, features and attendant advantages of the present invention will become fully appreciated as the same becomes better understood when considered in conjunction with the accompanying drawings, in which like reference characters designate the same or similar parts throughout the several views, and wherein:

FIG. 14 is a top view of the second alternative embodiment in an engaged position with respect to a conveyor belt.

DETAILED DESCRIPTION OF THE INVENTION

A. Overview

Figure 7:
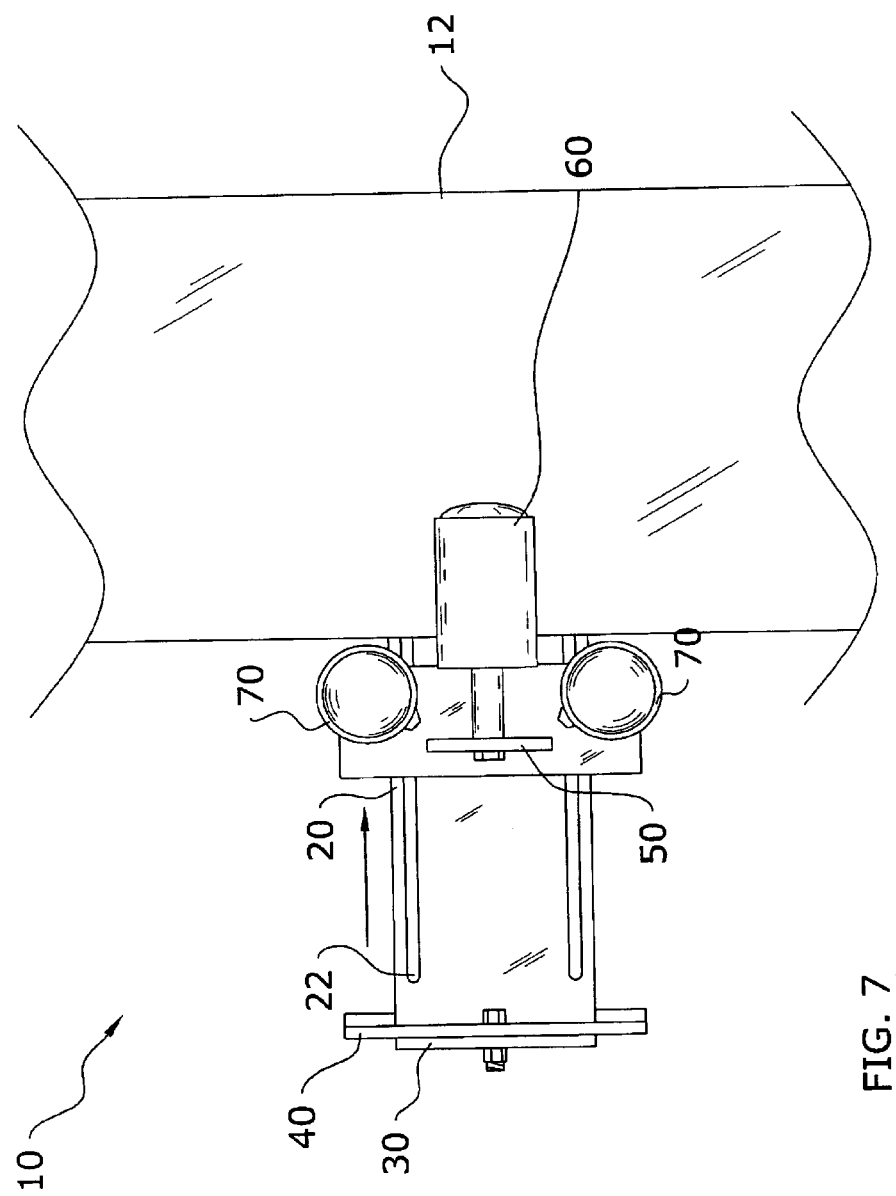
FIG. 7 is a top view of the present invention in an engaged position with respect to a conveyor belt.
Figure 8:
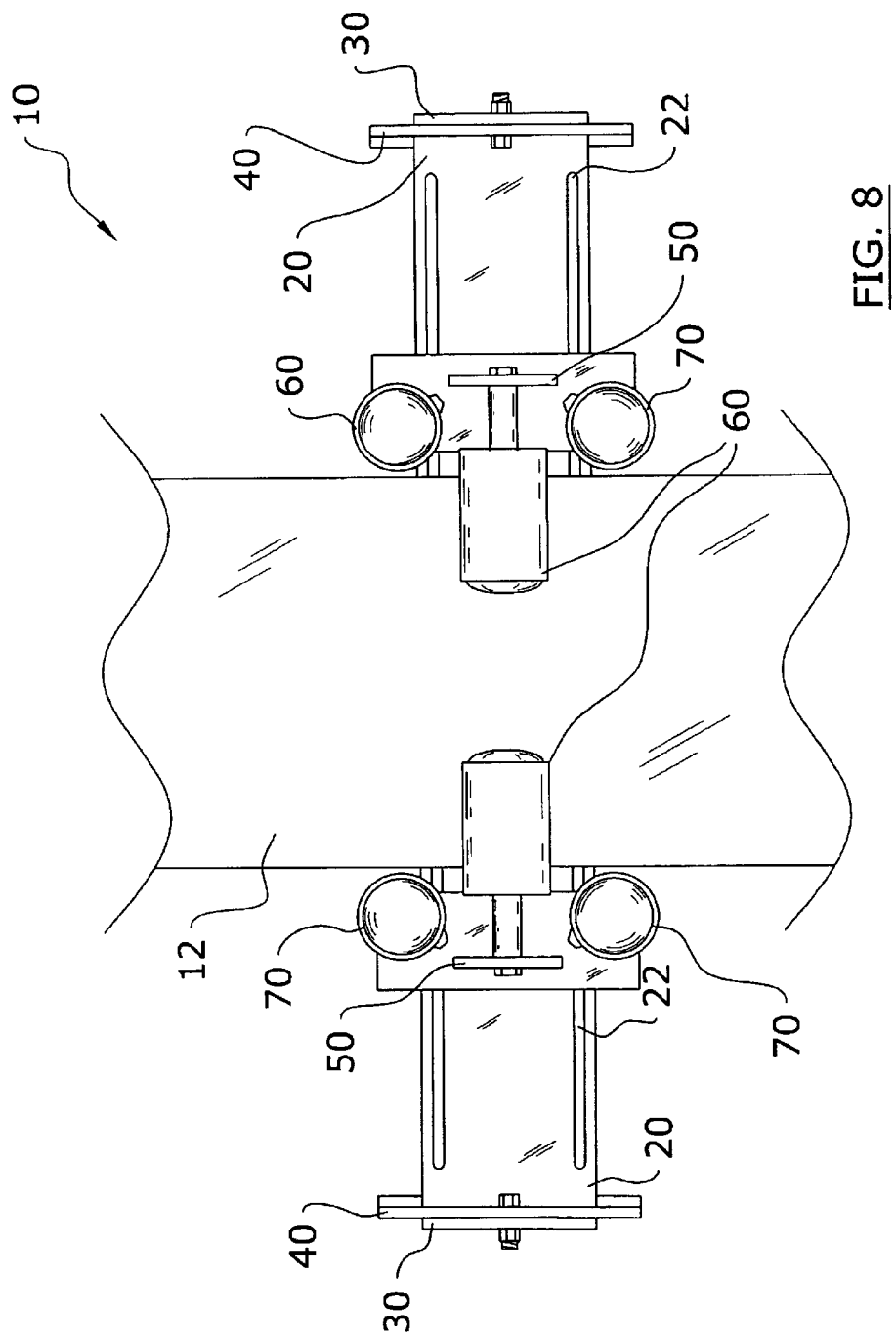
FIG. 8 is a top view of the present invention positioned on opposing sides of the conveyor belt.

Turning now descriptively to the drawings, in which similar reference characters denote similar elements throughout the several views, FIGS. 1 through 10 illustrate a conveyor belt alignment system 10, which comprises a mounting plate 40 for attaching to a structure, a first plate 20 attached to a second plate 30, wherein the second plate 30 is adjustably attached to the mounting plate 40, a support frame 50 adjustably positioned upon the first plate 20, a plurality of first idlers 60 extending from the support frame 50, and a plurality of second idlers 70 extending from the support frame 50. The first idlers 60 are positioned on opposite surfaces of the conveyor belt 12 for vertical alignment. The second idlers 60 are positioned on the same surface as the conveyor belt 12 for horizontal alignment of the conveyor belt 12. The second idlers 60 have an upper guide member 72 and a lower guide member 74, wherein the conveyor belt 12 is positioned between the guide members 72, 74 on each second idler 60. FIGS. 8 and 14 illustrate that utilizing a pair of the present inventions on opposing sides of the conveyor belt 12 is desirable.

B. Mounting Plate

Figure 2:
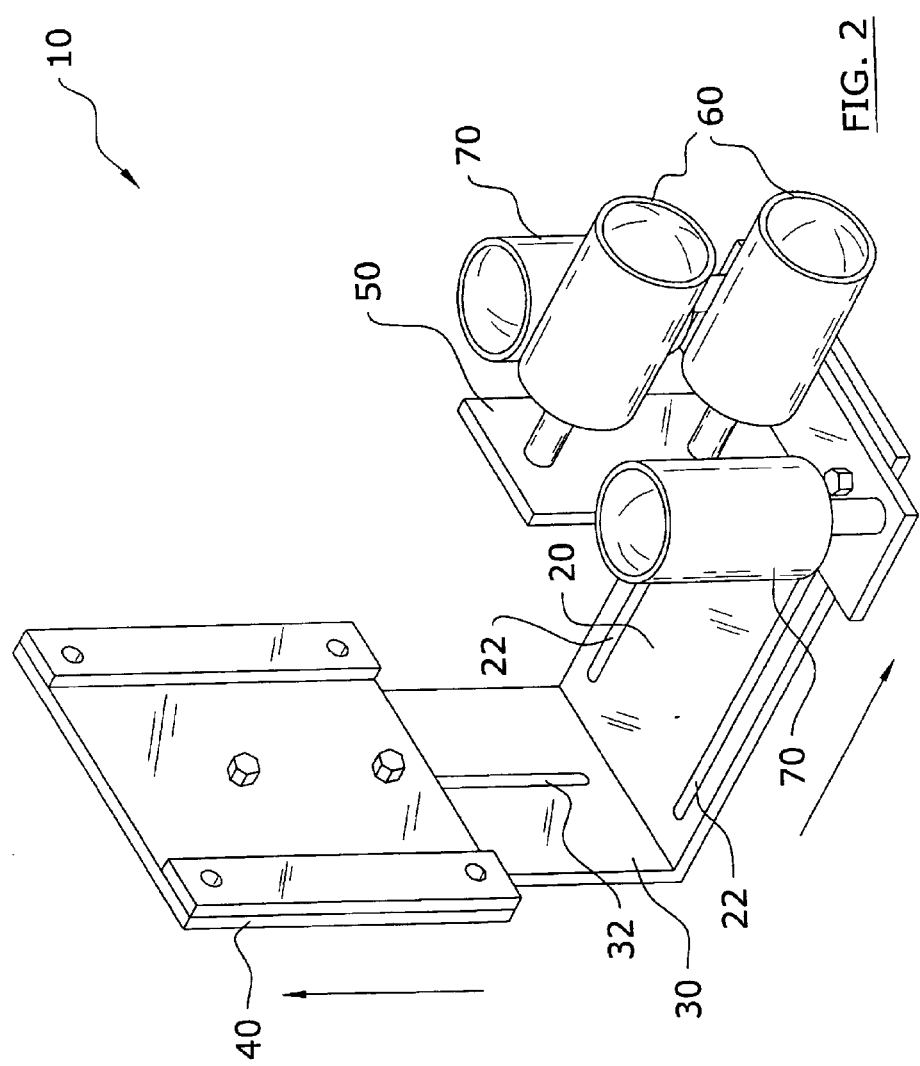
FIG. 2 is an upper perspective view of the present invention with the idlers lowered and extended.

A mounting plate 40 is provided for attaching to a structure (e.g. frame of conveyor, external structure). The mounting plate 40 may have a plurality of apertures for receiving a plurality of fasteners such as shown in FIG. 2 of the drawings. The mounting plate 40 may be attached to the structure utilizing various other conventional fastening methods and structures.

C. Adjustment Structure

An adjustment structure is adjustably attached to the mounting plate 40. The adjustment structure is comprised of a first plate 20 attached to a second plate 30 forming an L-shaped structure. It can be appreciated that other shapes may be formed for the adjustment structure other than illustrated in the drawings.

The second plate 30 is adjustably attached to the mounting plate 40 in a vertical manner as illustrated in FIG. 2 of the drawings. The second plate 30 has at least one second slot 32 for receiving fasteners extending through the mounting plate 40 as shown in FIG. 2 of the drawings. The user is able to secure the vertical position of the second plate 30 by tightening the fasteners. It can be appreciated that other types of securing methods and systems may be utilized to adjustably secure the second plate 30 to the mounting plate 40.

Figure 1:
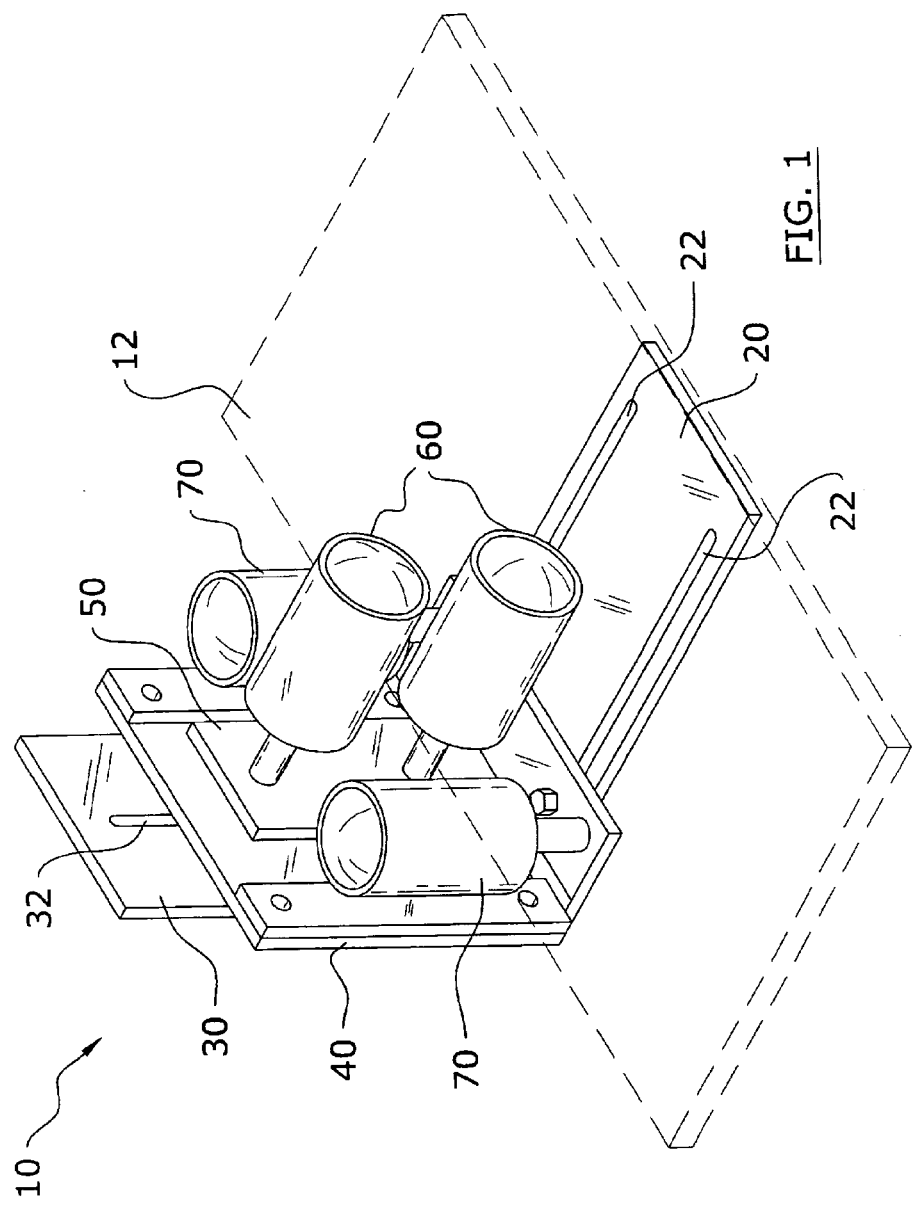
FIG. 1 is an upper perspective view of the present invention.

The first plate 20 has at least one first slot 22 for receiving fasteners extending through the support frame 50 as shown in FIGS. 1 and 2 of the drawings. The first slot 22 may be transversely orientated with respect to the second slot 32 as shown in FIG. 2 of the drawings.

D. Support Frame

The support frame 50 is adjustably positioned upon the adjustment structure as shown in FIG. 2 of the drawings. More particularly, the support frame 50 is adjustably attached to the first plate 20 in a horizontal manner. The support frame 50 may be moved horizontally closer or away with respect to an edge of the conveyor belt 12. Fasteners or other securing structures may be utilized to secure the support frame 50 to the first plate 20.

E. Idlers

Figure 3:
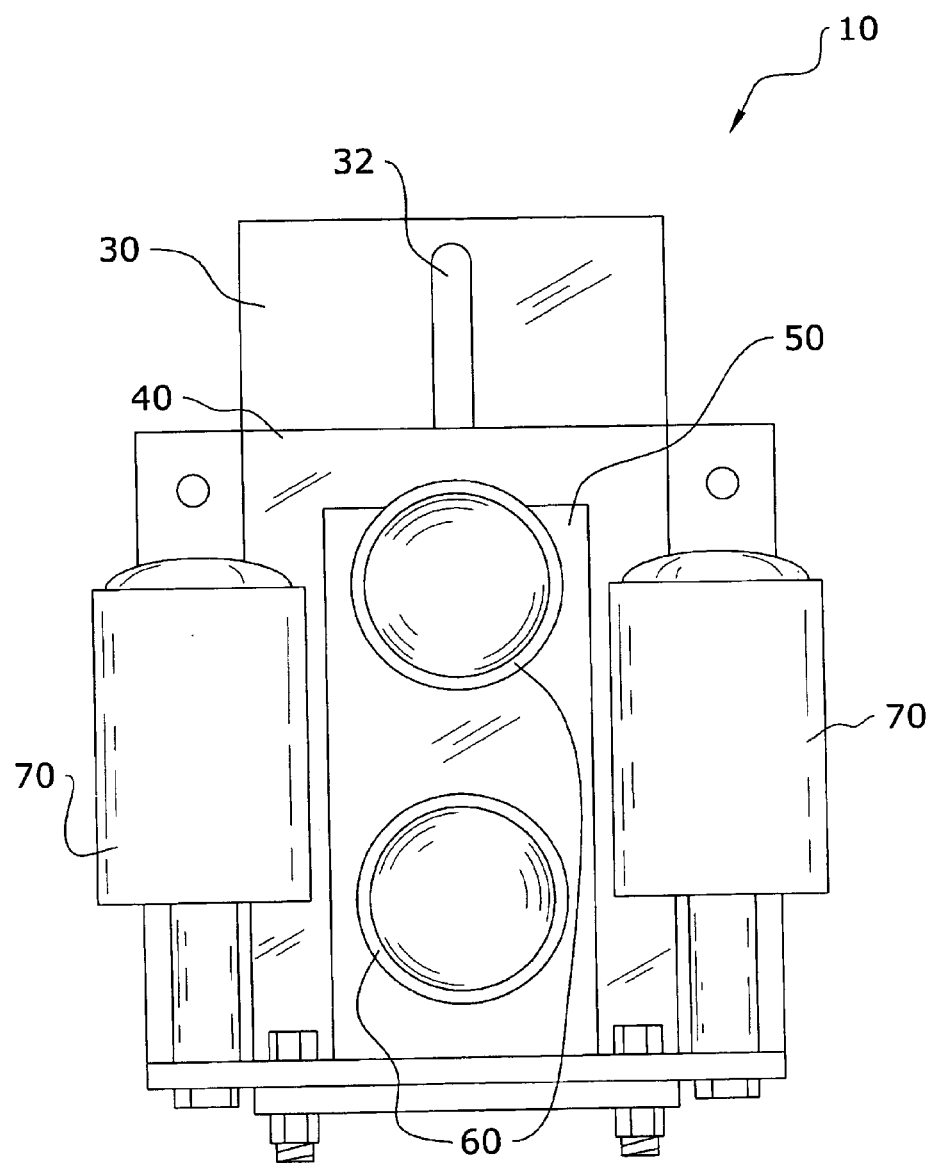
FIG. 3 is an end view of the present invention.
Figure 4:
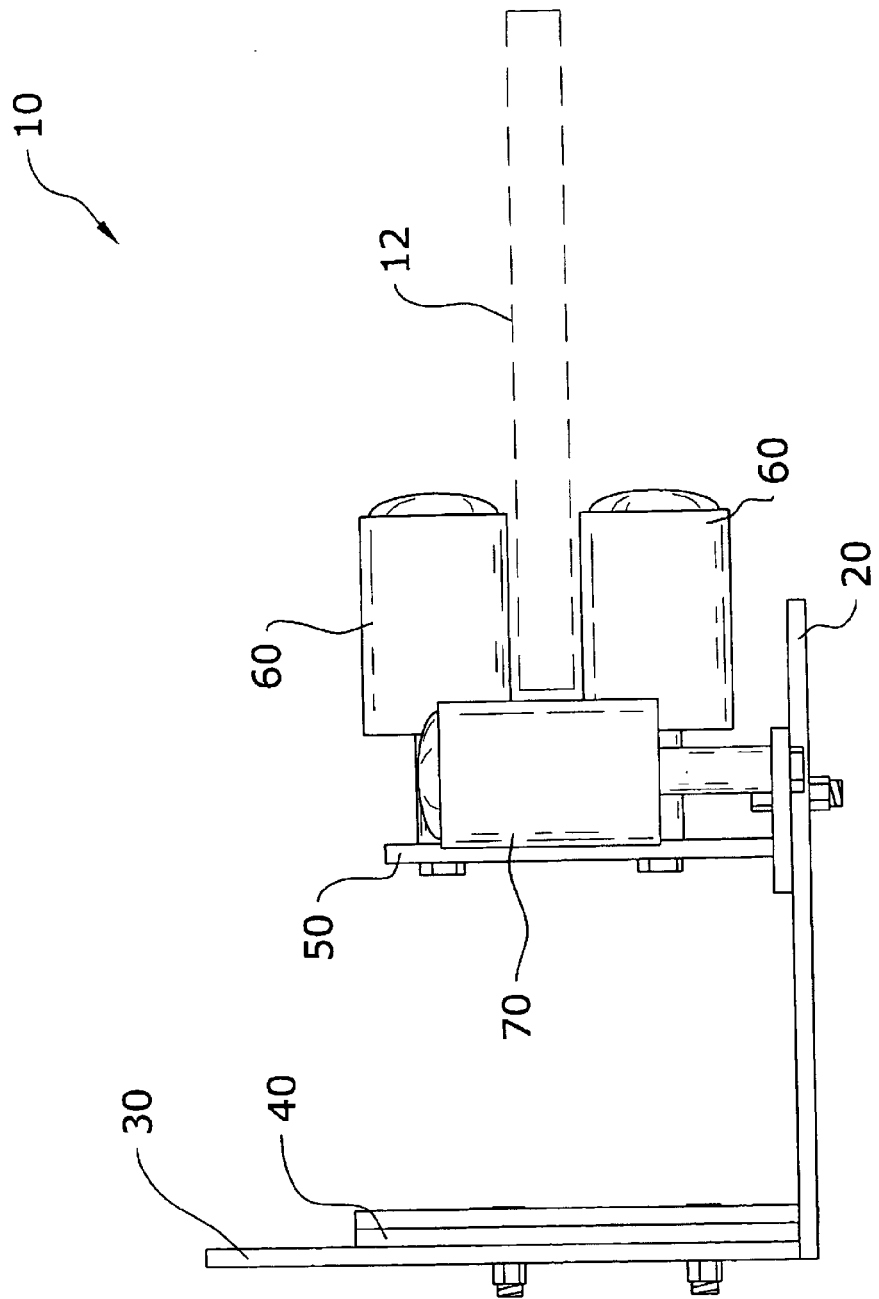
FIG. 4 is a side view of the present invention.
Figure 5:
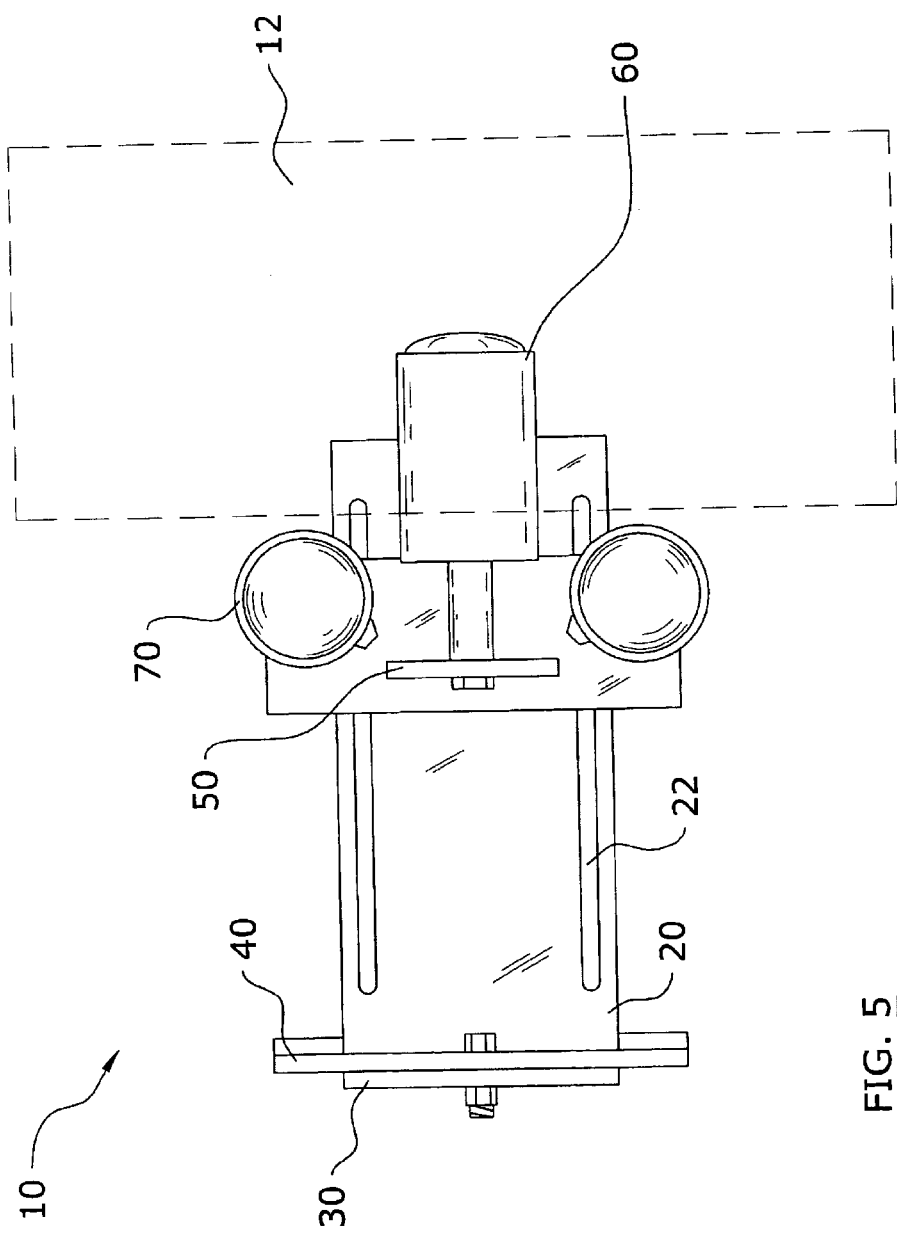
FIG. 5 is a top view of the present invention.
Figure 6:
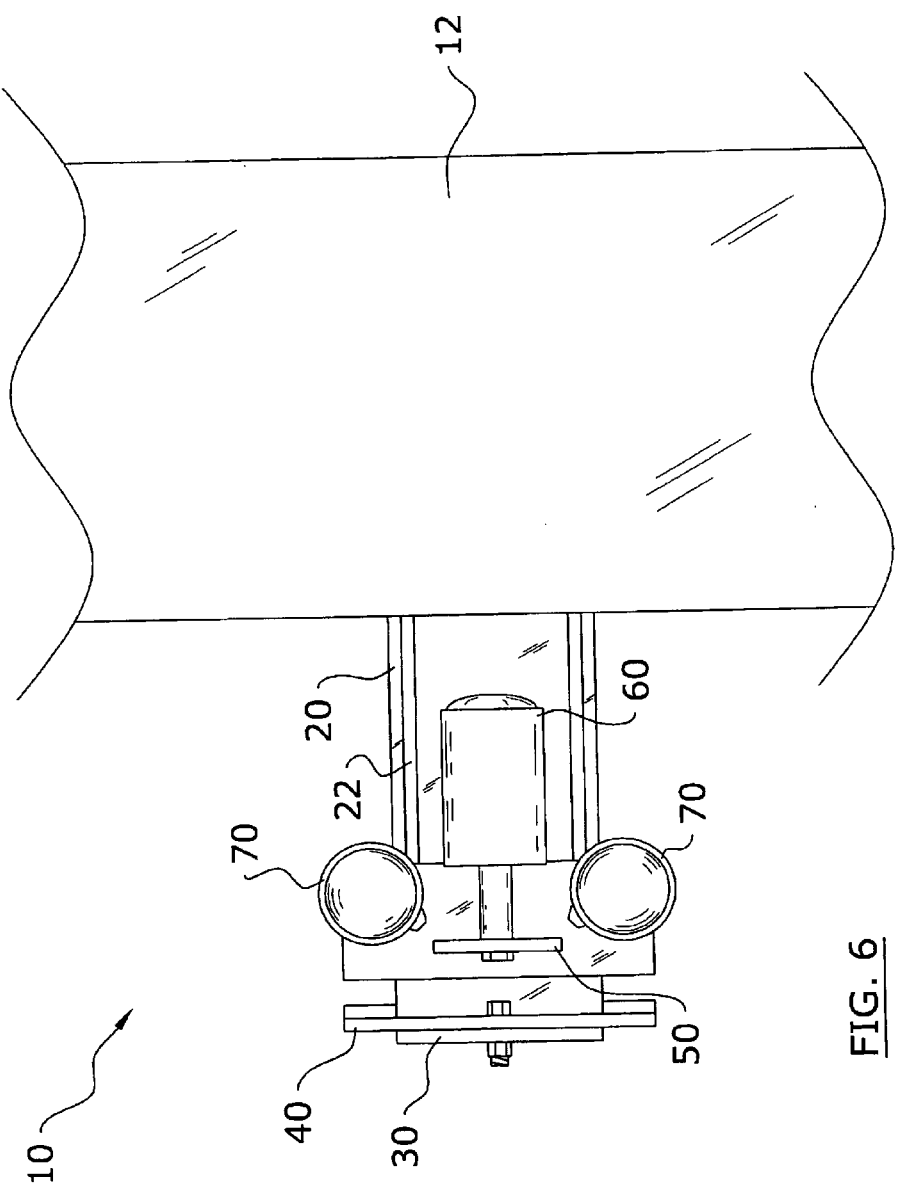
FIG. 6 is a top view of the present invention in a released position with respect to a conveyor belt.

A plurality of first idlers 60 rotatably extend from the support frame 50 in a parallel manner with respect to one another as shown in FIG. 4 of the drawings. A plurality of second idlers 70 extend from the support frame 50 in a parallel manner with respect to one another as shown in FIG. 3 of the drawings. The second idlers 70 may be substantially transverse with respect to the first idlers 60 as shown in FIG. 4 of the drawings.

The first idlers 60 are positionable on opposite surfaces (top and bottom) of a conveyor belt 12 for vertical alignment of a conveyor belt 12 as shown in FIG. 4 of the drawings. The second idlers 70 are positionable on a same side of a conveyor belt 12 for horizontal alignment of a conveyor belt 12 as shown in FIGS. 4 and 7 of the drawings.

F. Alternative Embodiments

Figure 10:
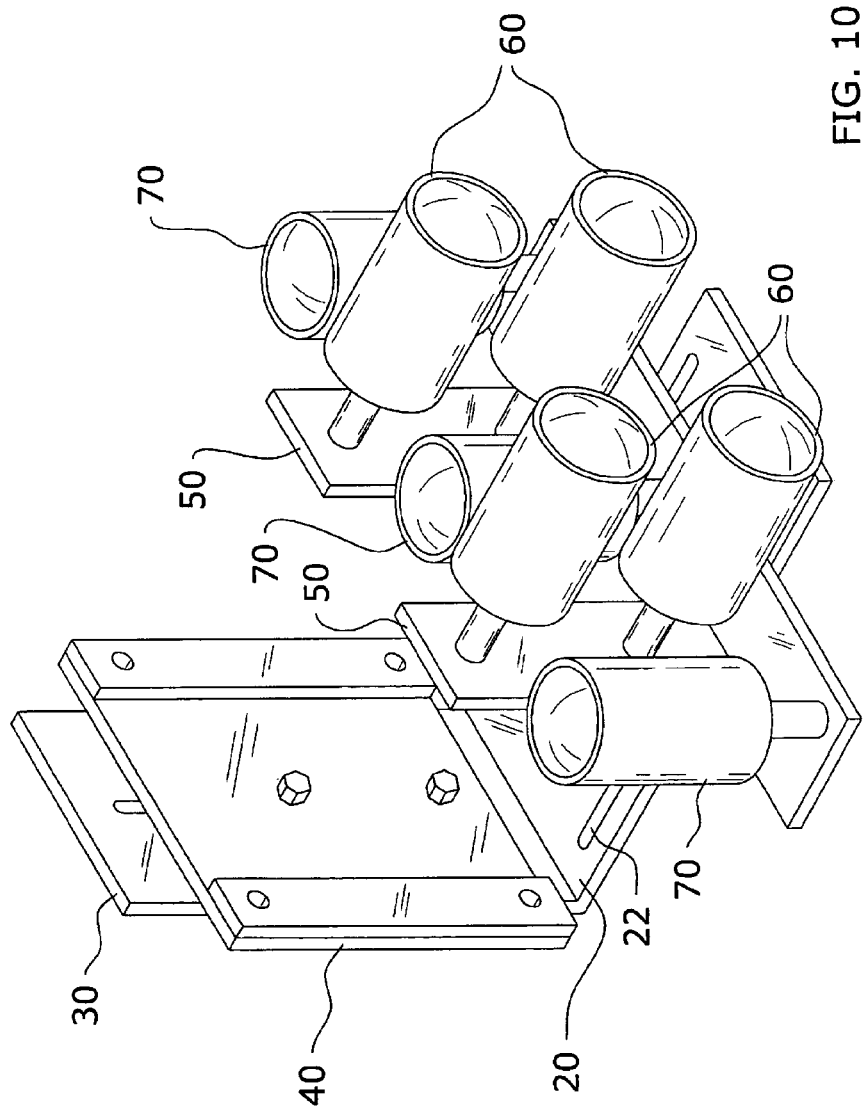
FIG. 10 is an upper perspective view of an alternative embodiment of the present invention.
Figure 11:
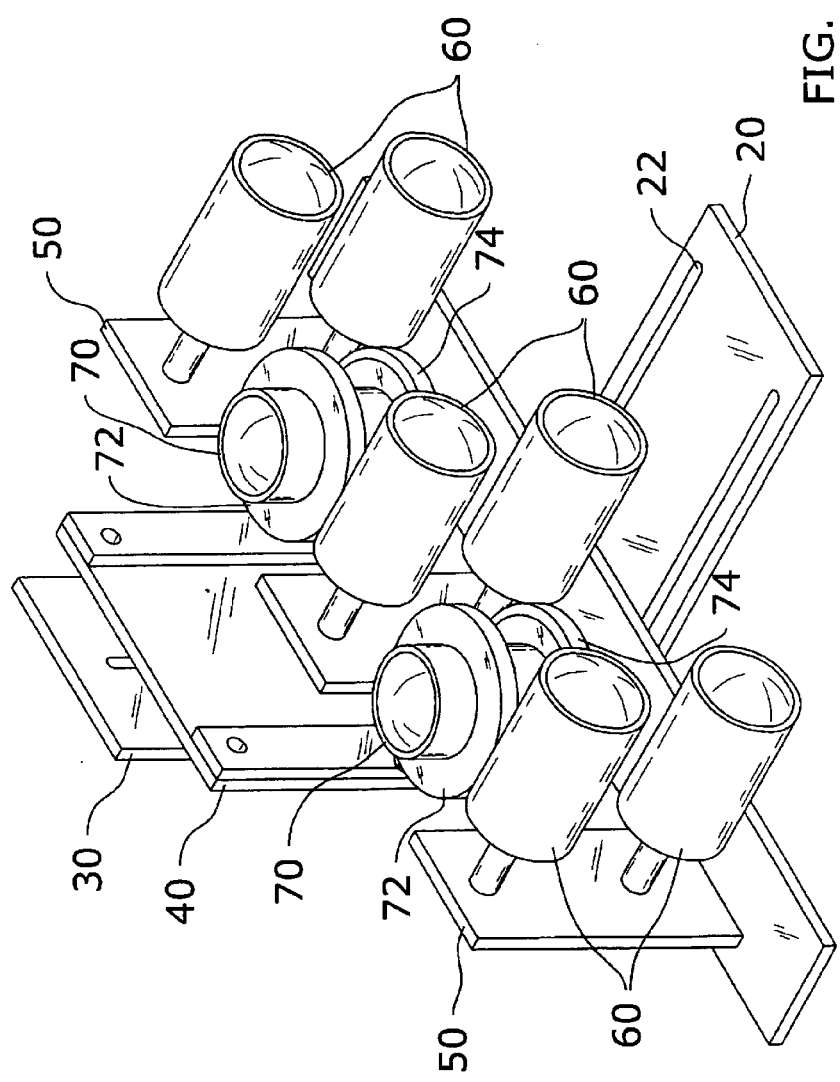
FIG. 11 is an upper perspective view of a second alternative embodiment of the present invention.
Figure 12:
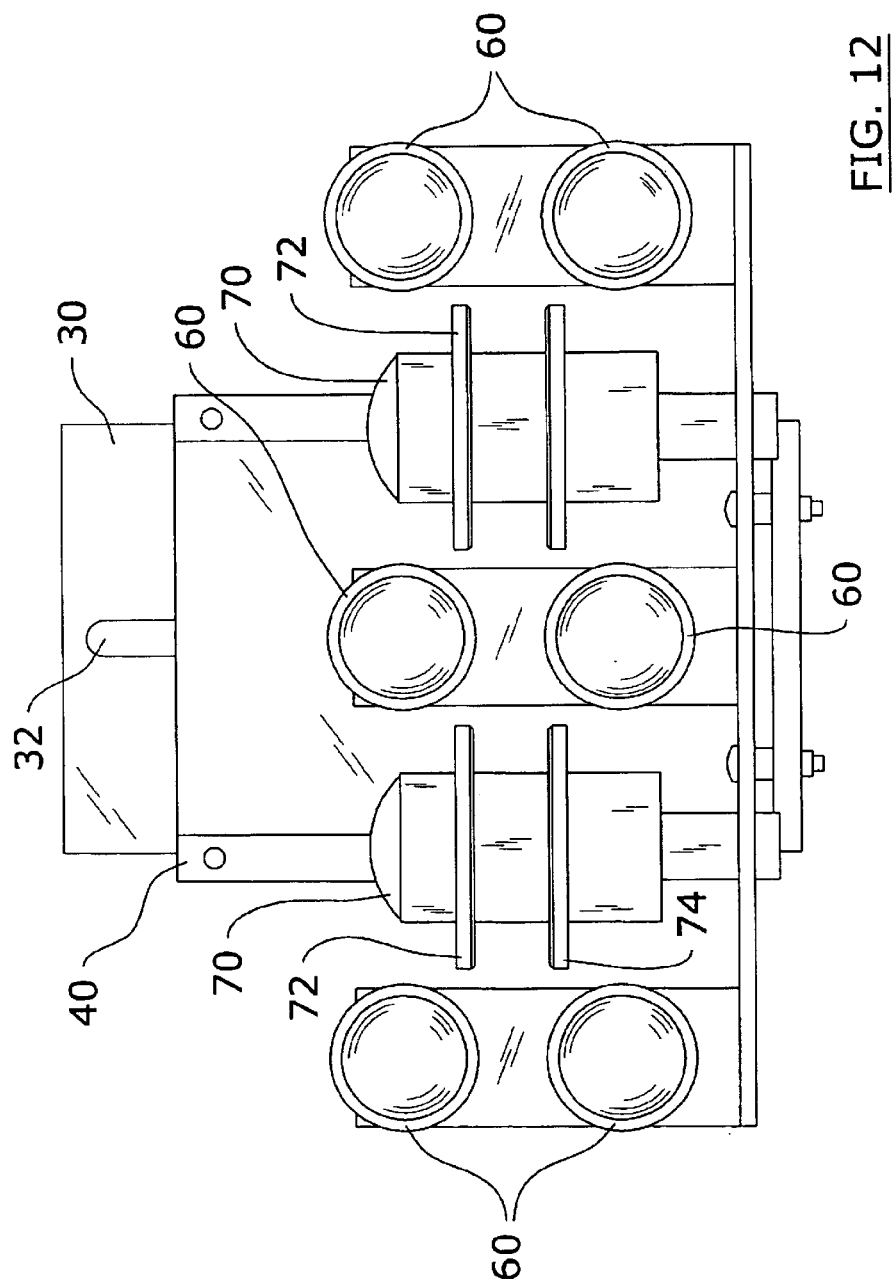
FIG. 12 is an end view of the second alternative embodiment.

FIG. 10 illustrates an alternative embodiment of the present invention where increased numbers of first idlers 60 and second idlers 70 are utilized. It can be appreciated that various other numbers of idlers 60, 70 may be utilized.

FIGS. 11 through 14 illustrate upper guide members 72 and lower guide members 74 extending radially and transversely from the second idlers 70 defining a channel between thereof that receives the conveyor belt 12. The upper guide members 72 and lower guide members 74 assist in retaining the conveyor belt 12 at a preferred constant height between the guide members 72, 74 with respect to the first idlers 60.

The guide members 72, 74 are preferably comprised of a cincture structure as further shown in FIGS. 11 through 14 of the drawings. The cincture structure of the guide members 72, 74 is preferably comprised of a solid ring structure having smooth upper surfaces and lower surfaces.

G. Operation of Invention

Figure 9:
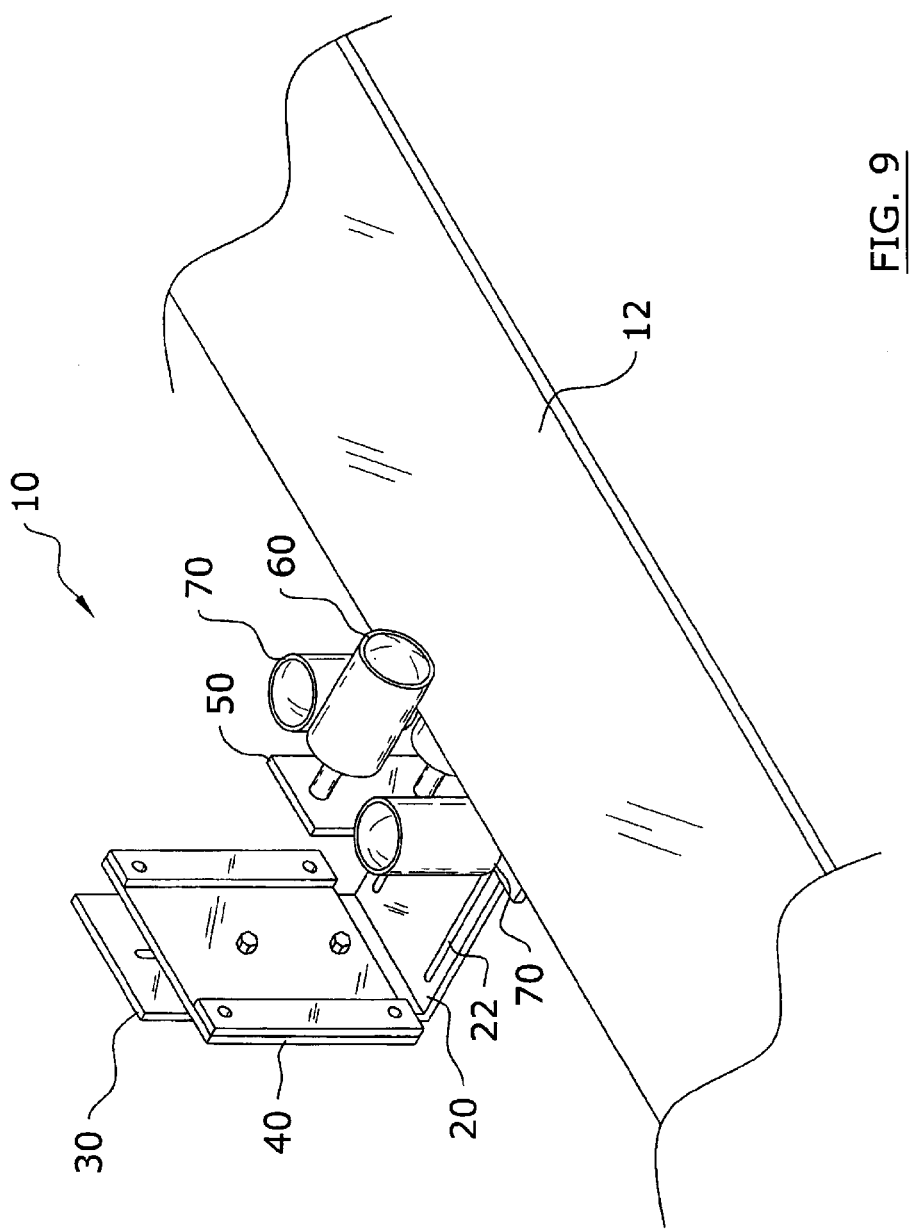
FIG. 9 is an upper perspective view of the present invention aligning a conveyor belt.

The user attaches the mounting plate 40 to the frame of the conveyor or an adjacent structure. The user then adjusts the vertical position of the second plate 30 to a desired vertical height so that the conveyor belt 12 is properly positioned between the first idlers 60 as illustrated in FIGS. 4 and 9 of the drawings.

The user then adjusts the horizontal position of the first plate 20 to a desired position so that the second idlers 70 are positioned near or adjacent to an edge of the conveyor belt 12 as shown in FIGS. 7 and 8 of the drawings. The above process may be repeated on the opposite side of the conveyor belt 12.

Figure 13:
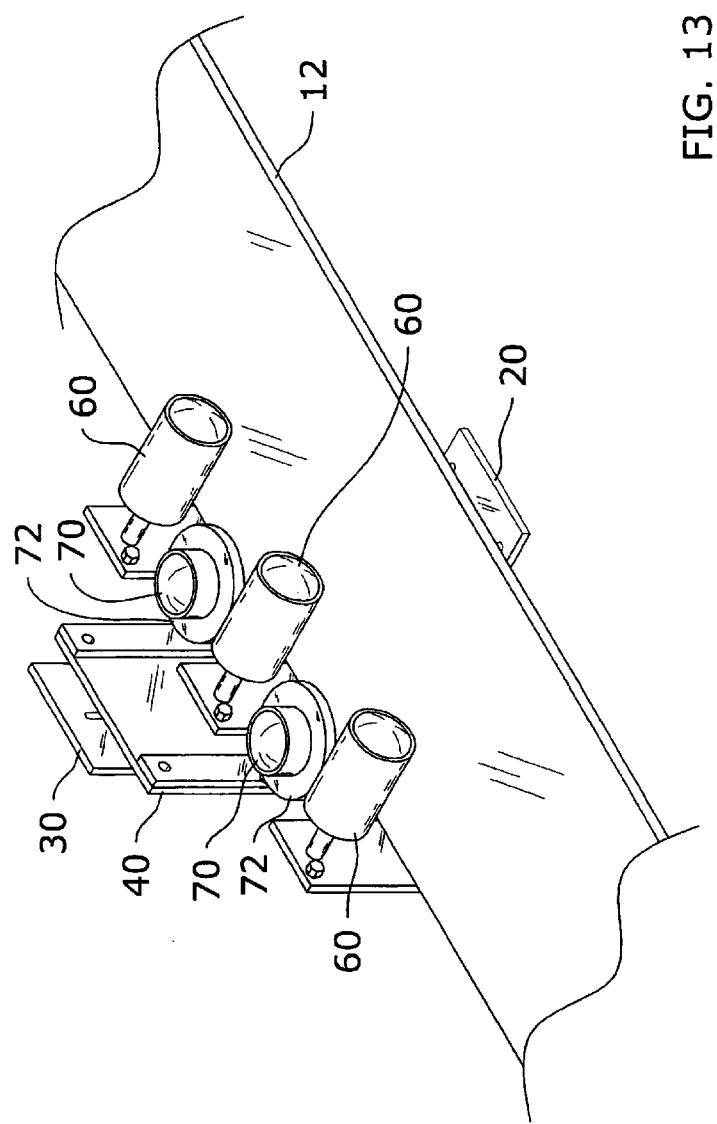
FIG. 13 is an upper perspective view of the second alternative embodiment of the present invention aligning a conveyor belt.

When using the second alternative embodiment, the user performs the prescribed process for setting the vertical position of the second plate 30 and first idlers 60. In addition, the user would adjust the horizontal position of the first plate 20 to a desired position so that the conveyor belt 12 passes between the upper guide member 72 and the lower guide member 74 of each second idler 70. The above process is illustrated in FIGS. 13 and 14.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed to be within the expertise of those skilled in the art, and all equivalent structural variations and relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A conveyor belt alignment system, comprising:
   a mounting plate for attaching to a structure;
   an adjustment structure adjustably attached to said mounting plate;
   a support frame adjustably positioned upon said adjustment structure;
   a plurality of first idlers extending from said support frame;
   a plurality of second idlers extending from said support frame; and
   an upper guide member and a lower guide member both radially extending from said plurality of second idlers, wherein said upper guide member and said lower guide member define a channel between thereof.

2. The conveyor belt alignment system of claim 1, wherein said adjustment structure is comprised of a first plate attached to a second plate forming an L-shaped structure.

3. The conveyor belt alignment system of claim 2, wherein said second plate is adjustably attached to said mounting plate.

4. The conveyor belt alignment system of claim 3, wherein said second plate has at least one second slot for receiving fasteners extending through said mounting plate.

5. The conveyor belt alignment system of claim 4, wherein said second slot is vertically orientated.

6. The conveyor belt alignment system of claim 2, wherein said support frame is adjustably attached to said first plate.

7. The conveyor belt alignment system of claim 6, wherein said first plate has at least one first slot for receiving fasteners extending through said support frame.

8. The conveyor belt alignment system of claim 6, wherein said first plate has at least one first slot for receiving fasteners extending through said support frame, wherein said second plate has at least one second slot for receiving fasteners extending through said mounting plate, wherein said first slot is transversely orientated with respect to said second slot.

9. The conveyor belt alignment system of claim 1, wherein said first idlers are positionable on opposite surfaces of a conveyor belt for vertical alignment of a conveyor belt.

10. The conveyor belt alignment system of claim 1, wherein said second idlers are positionable on a same side of a conveyor belt for horizontal alignment of a conveyor belt, wherein the conveyor belt is positionable between said upper guide member and said lower guide member.

11. A conveyor belt alignment system, comprising:
    a mounting plate for attaching to a structure;
    an adjustment structure adjustably attached to said mounting plate;
    a support frame adjustably positioned upon said adjustment structure;
    a plurality of first idlers extending from said support frame in a parallel manner; and
    a plurality of second idlers extending from said support frame in a parallel manner substantially transverse with respect to said first idlers; and
    an upper guide member and a lower guide member both radially extending from said plurality of second idlers, wherein said upper guide member and said lower guide member define a channel between thereof.

12. The conveyor belt alignment system of claim 11, wherein said adjustment structure is comprised of a first plate attached to a second plate forming an L-shaped structure.

13. The conveyor belt alignment system of claim 12, wherein said second plate is adjustably attached to said mounting plate.

14. The conveyor belt alignment system of claim 13, wherein said second plate has at least one second slot for receiving fasteners extending through said mounting plate.

15. The conveyor belt alignment system of claim 14, wherein said second slot is vertically orientated.

16. The conveyor belt alignment system of claim 12, wherein said support frame is adjustably attached to said first plate.

17. The conveyor belt alignment system of claim 16, wherein said first plate has at least one first slot for receiving fasteners extending through said support frame.

18. The conveyor belt alignment system of claim 16, wherein said first plate has at least one first slot for receiving fasteners extending through said support frame, wherein said second plate has at least one second slot for receiving fasteners extending through said mounting plate, wherein said first slot is transversely orientated with respect to said second slot.

19. The conveyor belt alignment system of claim 11, wherein said first idlers are positionable on opposite surfaces of a conveyor belt for vertical alignment of a conveyor belt, wherein said second idlers are positionable on a same side of a conveyor belt for horizontal alignment of a conveyor belt, and wherein the conveyor belt is positionable between said upper guide member and said lower guide member.

20. A conveyor belt alignment system, comprising:
    a mounting plate for attaching to a structure;
    an adjustment structure adjustably attached to said mounting plate;
    a support frame adjustably positioned upon said adjustment structure;
    a plurality of first idlers extending from said support frame in a parallel manner;
    a plurality of second idlers extending from said support frame in a parallel manner substantially transverse with respect to said first idlers;

an upper guide member and a lower guide member both radially extending from said plurality of second idlers, wherein said upper guide member and said lower guide member define a channel between thereof;

wherein said adjustment structure is comprised of a first plate attached to a second plate forming an L-shaped structure;

wherein said second plate is adjustably attached to said mounting plate;

wherein said support frame is adjustably attached to said first plate;

wherein said first plate has at least one first slot for receiving fasteners extending through said support frame, wherein said second plate has at least one second slot for receiving fasteners extending through said mounting plate, wherein said first slot is transversely orientated with respect to said second slot; and wherein said first idlers are positionable on opposite surfaces of a conveyor belt for vertical alignment of a conveyor belt, wherein said second idlers are positionable on a same side of a conveyor belt for horizontal alignment of a conveyor belt, and wherein the conveyor belt is positionable between said upper guide member and said lower guide member.

* * * * *